L. H. ROGERS.
Wheels for Vehicles.
No. 154,913.               Patented Sept. 8, 1874.
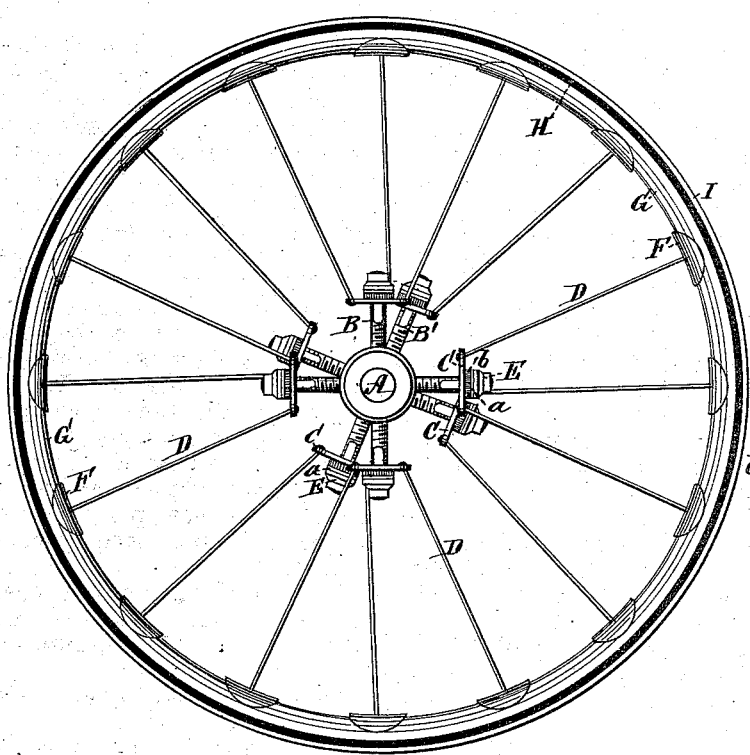
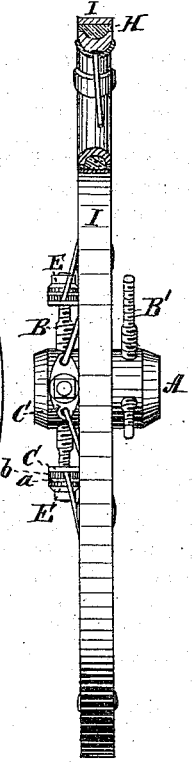
WITNESSES:
INVENTOR:
ATTORNEYS.

UNITED STATES PATENT OFFICE.

LEWIS H. ROGERS, OF SOUTH AVON, NEW YORK.

IMPROVEMENT IN WHEELS FOR VEHICLES.

Specification forming part of Letters Patent No. 154,913, dated September 8, 1874; application filed August 14, 1874.

*To all whom it may concern:*

Be it known that I, LEWIS H. ROGERS, of South Avon, in the county of Livingston and State of New York, have invented a new and Improved Wheel for Vehicles; and I do hereby declare that the following is a full, clear, and exact description of the same, reference being had to the accompanying drawing forming a part of this specification, in which—

Figure 1 is a vertical side elevation. Fig. 2 is a vertical edge view, with felly, tire, &c., broken away, showing sections of same.

The object of this invention is to provide a wheel for vehicles of such an elastic construction as shall facilitate the easy movement of vehicles, and, in some instances, render unnecessary the use of springs. It consists in a metallic hub, having two sets of screw-threaded stems projecting radially from the same, to which are fastened small plates, held to said stems by a nut and a washer, there being between the said washer and plate an elastic pad. Said plates are attached on each side of the stems to metallic spring-spokes, and said spokes securely fastened to clips that are riveted to a metallic felly. Said felly is preferably made with a concave periphery, and in between the felly and the tire is placed a rim of rubber or other elastic substance.

In the drawing, A represents the metallic hub, having the two sets of screw-threaded stems B B' projecting radially from the hub, disposed alternately upon the same, and slightly flattened upon their sides. C are plates fitting upon said stems, to which are attached the metallic spring-spokes D. The said spokes are preferably made a little curved, to increase their elasticity, and are fastened to the plates C by nuts. In the place, however, of the said plate, with a spoke riveted on each side, I may make the two spokes in one piece, with the middle enlarged, bent to one side, flattened, and perforated, forming thereby a kind of stirrup, which performs the same function as the plate C, and saves the trouble of riveting. E are the nuts upon the stems, by means of which the spokes are tightened. Said nuts press against the plates C through the washer *a* and pad *b*, which is made of rubber or other elastic material, for the purpose of adding to the spring of the wheel. F are thin metallic clips, which fasten the spokes to the felly G, and H is a band of rubber or other elastic material, which is held between the felly and tire, the said felly being preferably made concave upon its periphery to receive it. The two sets of stems B B', with their corresponding spokes, are arranged alternately and in different planes, for the purpose of increasing the strength of the wheel without adding to the weight, and are made flat upon their sides to prevent the plates C from turning upon the same.

The rubber band H and washers *a* operate in combination with the spring of the spokes, and by that means give the requisite amount of elasticity to the wheel.

What I claim as new, and desire to secure by Letters Patent, is—

1. The combination of the radial screw-threaded stems B B', nuts E, washers *a*, elastic pads *b*, plates C, and metallic spring-spokes D, substantially as and for the purpose described.

2. The combination of the radial screw-threaded stems B B', nuts E, washer *a*, elastic pads *b*, metallic spring-spokes D, metallic felly G, the elastic band H, and tire I, substantially as and for the purpose described.

LEWIS H. ROGERS.

Witnesses:
E. H. DAVIS,
M. G. SWAN.